United States Patent [19]

Noodén

[11] Patent Number: 4,581,057
[45] Date of Patent: Apr. 8, 1986

[54] ABSCISIC ACID CONTAINING FOLIAR FERTILIZERS AND METHOD OF USING SAME TO ENHANCE CROP YIELDS

[75] Inventor: Larry D. Noodén, Ann Arbor, Mich.

[73] Assignee: The Board of Regents of University of Michigan, Corp. of Michigan, Ann Arbor, Mich.

[21] Appl. No.: 589,839

[22] Filed: Mar. 15, 1984

[51] Int. Cl.$^4$ ................................................ C05C 9/00
[52] U.S. Cl. ......................................... 71/28; 71/27; 71/64.10; 71/59; 71/65; 71/79
[58] Field of Search .................... 71/27, 1, 64.1, 65, 71/79, 81, 94, 95, DIG. 1, 28, 59

[56] References Cited

U.S. PATENT DOCUMENTS 4,310,348 1/1982 Budai et al. .................... 71/DIG. 1
4,361,436 11/1982 McCarthy et al. ................ 71/94 X

OTHER PUBLICATIONS

CA100(17): 136125k, Hester et al, 1984, "Effect of Plant Growth . . . Erythritol".

Primary Examiner—Ferris H. Lander
Attorney, Agent, or Firm—William T. Hough

[57] ABSTRACT

A composition and method for enhancing the yield of crop plants by incorporation of an abscisic acid derivative or physiological analogs thereof in a foliar fertilizer composition containing one or more sources of such nutrients and applying same to the foilage of plants.

22 Claims, 1 Drawing Figure

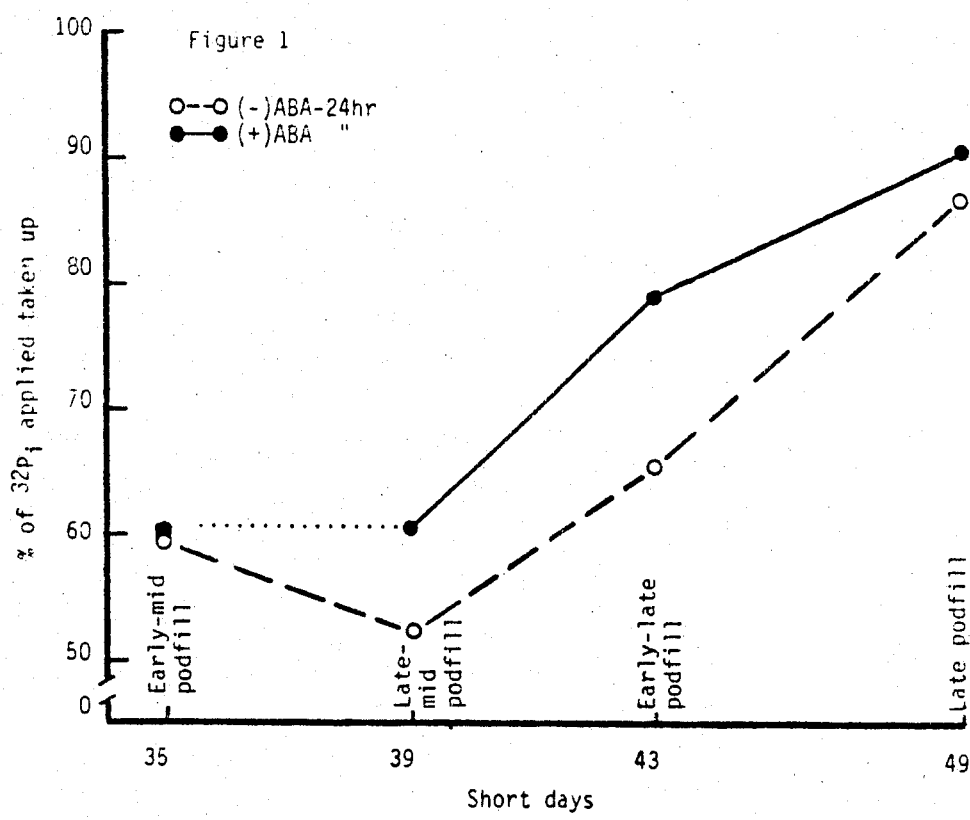

ABSCISIC ACID CONTAINING FOLIAR FERTILIZERS AND METHOD OF USING SAME TO ENHANCE CROP YIELDS

DESCRIPTION

BACKGROUND OF THE INVENTION

1. Field of the Invention

This invention relates to a unique foliar fertilizer formulation, and a method of applying same to field crops, such as legume crops as for example soybean, beans, peas and the like; other dicotyledonous crop plants, such as cotton, tomato, potato and the like; and grasses such as corn (maize), wheat and the like cereal grain crops. More particularly, this invention relates to a foliar fertilizer formulation and a method of applying such formulation which provide for enhanced crop yields.

2. Prior Art

The use of certain six-membered carbocyclic substituted, 1,3-butadiene compounds as plant growth regulants is known. For example, Netherlands Pat. No. 6,703,449 discloses the use of 3-methyl-5-(1-hydroxy-4-oxo-2,6,6-trimethyl-2-cyclohexenyl)-2,4-pentadienoic acid to induce leaf senescene in sprouts, potatoes and cotton while at the same time stimulating fruit development. Similarly, U.S. Pat. No. 3,499,750 discloses that 3-methyl-5-(1-hydroxy-4-oxo-2,6,6-trimethyl-2-cyclohexen-1-yl)-2,4-pentadienoic acid can be used to accelerate the ripening of commercially important fruit such as olives, cotton (bolls) and nuts, and Netherlands Pat. No. 6,703,020 discloses thatthis compound can be used to stimulate growth, flowering and defoliation of cotton plants, olive treesand citrus trees. Lastly, U.S. Pat. No. 3,576,839 teaches that six-membered carbocyclic substituted 1,3-butadiene compounds, such as 1-hydroxy-p-2,6,6-tetramethyl-4-oxo-2-cyclohexene-1-penta-2,4-dienoic acidmethyl ester, can be used in pre-emergent herbicidal applications to delay the germination of seeds, and in post-emergent applications to defoliate and to effect leaf senescence.

The effects of plant hormones and growth regulators on solute uptake into plant cells has attracted some attention and both promotive and inhibitory effects have been shown (Encycl. PlantPhysiol., N.S., IIB: 307-342, 1976). The ability of the plant hormone abscisic acid to promote ion flux from the stomatal guard cells has been investigated fairly extensively (An. Rev. Plant Physiol. 31:453–489, 1980). It has also been reported that abscic acid increases the transport of $^{86}$Rb-Rb+ from the primary leaves to the roots of bean plants (Zeitschr Pflanzenphysiol. 78: 95–102, 1976).

In foliar feeding of plants, the nutrients are dissolved in water and the aqueous solution of nutrients is sprayed onto the leaves of the plants. U.S. Pat. No. 3,087,806 describes a method for improving the yield of soybeans by spraying the plants periodically throughout their growth with an aqueous solution of urea phosphate. The patent recommends twice weekly applications, and in an example such twice weekly sprayings were carried out for a period of 18 weeks.

U.S. Pat. No. 3,558,300 describes a method for foliar feeding of field crops, including soybeans and cereal grains, with an aqueous solution of ammonium polyphosphate. Adequate ground fertilizer is employed in conjunction with the foliar feeding. It is claimed that the method improves the stress resistance of the plants. The ammonium polyphosphate solution is described as being applied during the crop growth period up to the flowering period.

U.S. Pat. No. 4,038,064 describes a foliar fertilizer composition containing urea, water, potassium, phosphorus in the form of linear polyphosphates, and micronutrients, such as sulfur, boron, zinc, iron, manganese and copper. The patent also describes a process of improving soybean plant yield by applying the composition to the foliage of the soybean plant. The patent states that the composition must be applied during the period from shortly before flowering to shortly after the beginning of seed fill.

U.S. Pat. No. 4,146,383 describes a method for improving the yield of legume field crops and cereal grain crops by applying a foliar fertilizer composition containing sources of nitrogen, phosphorus, potassium and sulfur to the foliage of the crops during the seed filling period. The patent specifies that prior to the seed filling period, nutrients are supplied to the growing legume and cereal crops exclusively from the ground.

U.S. Pat. No. 4,033,146 describes a method of fertilizing conifer forests with nitrogen containing compounds by direct aerial application to the conifer foliage of an aqueous solution containing a nitrogen source, such as urea, ammonia, and nitrates of ammonium, calcium, and potassium; ammonium phosphates and sulfates; or combinations thereof. The patent states that other micronutrients including iron, manganese, copper and zinc can be added to the solution.

U.S. Pat. No. 4,033,747 discloses a method of fertilizing conifer forest by direct application to the foliage of the conifers of a solution containing a water-soluble nitrogen source. The patent also states that the solution may include sources of calcium, potassium, phosphorus, sulfur and minor trace metal nutrients, such as iron, cobalt, molybdenum, manganese, copper, boron, zinc, magnesium and mixtures thereof.

It has been reported that mixed results have been achieved with foliar fertilization of crops, especially field crops and more particularly soybeans. While some tests suggested that yield improvements could be achieved, others suggested that no improvements at all were realized from foliar application of nitrogen-phosphorus-potassium (N-P-K) solutions. The January, 1969 issue of "World Farming" contains a more complete dissertation of the benefits of N-P-K foliar fertilization and the limits of application level beyond which leaf scorch occurs. Another article reprinted from Ohio Farm and Home Research, Vol. 41, No. 302, September–October, 1956, reports no benefit from foliar application N-P-K solutions.

Unsuccessful attempts to increase crop yield by foliar fertilization have been reported by Mederski and Volk for wheat, corn, soybeans, oats and alfalfa. When the field crops were grown in soils with adequate fertility they failed to respond positively to foliar sprays containing N, P, and K. Mederski, H. J. and Volk, G. W., Foliar Fertilization of Field Crops, Ohio Agr. Exp. Sta. Research Cir 35, (August 1956). It has been generally assumed that legume and cereal grain crops which have adequate soil fertilization will not produce significantly higher yields of the grain by supplemental foliar fertilization, although it has been recognized that the nutrients in the spray are absorbed by the leaves of the plants.

It is believed that the adverse results were due to varying environmental factors, soil fertilizers, to the inability to apply more than small quantities of foliar fertilizers without damaging plant tissue, especially foliage and especially to an inability of the plant to effectuate translocation of foliarly-applied nutrients to those portions of the plant to obtain maximum benefit at a particular growth stage of the plant. For example, early in the vegetative growth stage when foliage or vegetative tissues require significant amounts of nutrients of growth, the normal translocative faculties of the plant do not direct the major portion of foliarly-applied nutrients to those growing tissues. Similarly, during the reproductive stage of growth, it is desirable to direct the majority of foliarly-applied nutrients to the reproductive tissues; however, the normal translocative mechanism of the plant does not comply with this requirement.

BRIEF DESCRIPTION OF THE DRAWING

FIG. 1 is a graph of the % 32 Pi applied taken up by the plant as a function of time resulting from the experiments of Example I, below.

SUMMARY OF THE INVENTION

The present invention is based on the discovery that inclusion of one or more abscisic acid derivatives or physiological analogs thereof (hereinafter referred to as "abscisic acid derivatives") inaqueous foliar fertilizers containing one or more macronutrients and micronutrients, such as one or more sources of nitrogen, phosphorus, sulfur, potassium and like materials which are indispensable to or advantageous to crop plants for growth and metabolism, and application of such fertilizer to the foliage of such plants has a pronounced effect on crop yields.

Therefore, in accordance with this invention there is provided an improved foliar fertilizer composition of the type containing one or more sources of nitrogen and optionally, one or more sources of potassium, one or more sources of phosphorus, one or more sources of sulfur and/or one or more sources of other plant micronutrients and macronutrients, said improvement comprising a "effective amount" of one or more abscisic acid derivatives which is sufficient to increase crop yield to any extent. This invention also provides a method of enhancing the yield of plants by applying a crop enhancing effective amount of the composition of this invention to the foliage of such crop plants at anytime during the period just before and during the reproductive growth stage.

DESCRIPTION OF THE PREFERRED EMBODIMENTS

One essential ingredient of the composition of this invention is an "effective amount" of one or more abscisic acid derivatives. As used herein, an "effective amount" is an amount of the said abscisic acid derivatives which is sufficient to enhance the yield crop plants to any extent. Usually, the above goal will be achieved if the composition contains at least about $10^{-9}$ weight percent of said abscisic acid derivatives based on the total weight of the composition. In the preferred embodiments of the invention, the amount of the said abscisic acid derivatives contained in the composition will vary from about $10^{-10}$ to about 10 weight percent based on the total weight of the composition, and in the particularly preferred embodiments will vary from about $10^{-8}$ to about 2.0 weight percent on the same basis. Amongst these particularly preferred embodiments of the invention most preferred are those in which the weight percent of said abscisic acid derivatives varies from about $10^{-7}$ to about $10^{-1}$ on the above-described basis.

As used herein "abscisic acid derivatives" refers to abscisic acid and to certain compounds which affect plants in substantially the same manner as abscisic acid. In general, such compounds may be identified as 1,3-butadiene derivatives having a six membered carbocyclic ring of the following formula:

O—M wherein:

(A) Q represents a monovalent six-membered carbocyclic radical selected from the group consisting of:

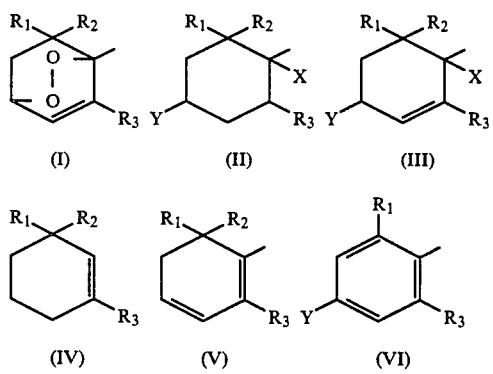

wherein:

$R_1$, $R_2$ and $R_3$ are the same or different and are hydrogen or alkyl of from about 1 to 4 carbon atoms;

W is —OH, —OR or a moiety of the formula:

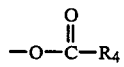

wherein $R_4$ is alkyl having from about 1 to 4 carbon atoms;

X is hydrogen or hydroxy;

Y is hydroxy, oxo, semicarbazono or a moiety of the formula:

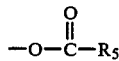

wherein $R_5$ is alkyl of from about 1 to 4 carbon atoms; and (B) M is a moiety of the formula:

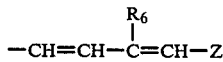

wherein:

$R_6$ is hydrogen or alkyl of from about 1 to about 4 carbon atoms; and

Z is selected from the group of monovalent radicals consisting of carboxy; a moiety of the formula:

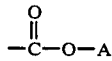

wherein A is selected from alkali metal cation, ammonium ion or substituted ammonium ion; an ester moiety of the formula:

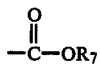

wherein $R_7$ is alkyl of from about 1 to 5 carbon atoms, aryl of up to about ten carbon atoms, alkyl of from about 1 to 5 carbon atoms substituted with at least one radical selected from the group consisting of halo, nitro and alkylsulfonyl of from about 1 to 4 carbon atoms, or aryl of up to about ten carbon atoms substituted with at least one radical selected from the group consisting of alkyl of from about 1 to 4 carbon atoms, halo, nitro, haloalkyl of from about 1 to 4 carbon atoms and alkylsulfonyl of from about 1 to 4 carbon atoms; hydroxyalkyl of from about 1 to 4 carbon atoms; cyano; and carbamoyl of the formula:

wherein T is selected from the group consisting of

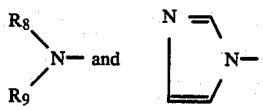

wherein $R_8$ and $R_9$ are the same or different and are hydrogen, alkyl of from about 1 to 4 carbon atoms or aryl of up to about ten carbon atoms; with the first proviso that when Q is selected from the radicals II and III, M is selected from the radicals

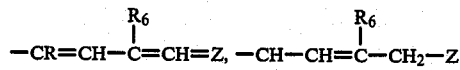

and

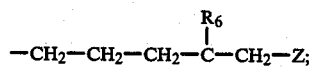

with the second proviso that when Z is carboxy, Q is selected from radicals II–VI and with the third proviso that when Q is radical III and Z is carboxy, Y is selected from hydroxy, semicarbazono, alkoxy, or

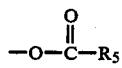

Preferred compounds are those of the above formula in which Z represents a carboxy group; an ester of the formula —COOR$_7$, wherein R$_7$ represents an alkyl group of from about 1 to 4 carbon atoms, a phenyl group, or a phenyl group substituted by a single nitro, trifluoromethyl or methylsulfonyl group; a hydroxymethyl group; a cyano group; a carbamoyl group (—CONH) or an imidazol-1-ylcarbonyl group; R$_1$, R$_2$, and R$_3$ represent methyl groups; X represents hydroxy; Y represents a hydroxy group, an oxo group, a semicarbazono group, a methoxy group or an acetoxy group; and W represents a hydroxy, methoxy or propionyloxy group. The same provisos described previously applying to the preferred compounds. Especially preferred compounds for use in the practice of the invention are those having the formula:

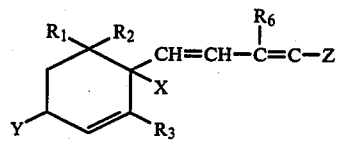

wherein Z is selected from the group consisting of:

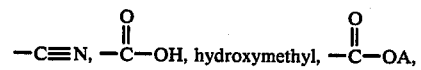

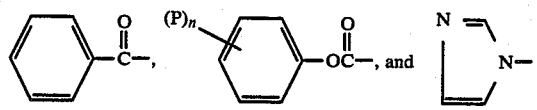

wherein P is the same or different at each occurrence and is alkylsulfonyl having from about 1 to about 4 carbon atoms, nitro or halomethyl; $R_1$, $R_2$, $R_3$ and $R_4$ are the same or different and are hydrogen, or alkyl having from about 1 to 4 carbon atoms; X is hydrogen or hydroxy; Y is hydroxy, oxo, semicarbazono or alkoxy having from about 1 to 4 carbon atoms; A is a metal cation or ammonium radical; and n is 0 or 1; with the proviso that when Z is

Y is hydrogen, semicarbazono or alkoxy having from about 1 to about 4 carbon atoms.

The halogens in the halomethyl include fluoride, chlorine, bromine and iodine with chlorine and fluorine being preferred. The ring substituents in the group

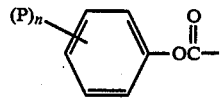

may be in the meta or para positions.

Particularly preferred compounds for use in the practice of this invention are those having the formula:

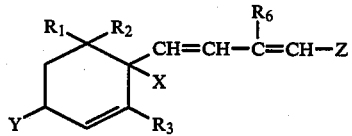

wherein
Y is oxo;
X is hydrogen or hydroxy;
$R_1$, $R_2$, $R_3$, and $R_6$ are the same or different and are alkyl having from 1 to about 4 carbon atoms; and
Z is

Exemplary abscisic acid derivatives which can be used in the practice of this invention are the following compounds:

1,4-dihydroxy,beta,2,6,6-tetramethyl-2-cyclohexene-1-penta-2,4-dienoic acid;

4-carbamoylhydrazono-1-hydroxy-beta,2,6,6-tetramethyl-2-cyclohexene-1-penta-2,4-dienoic acid monohydrate;

4-ethoxy-1-hydroxy-beta,2,6,6-tetramethyl-2-cyclohexene-1-penta-2,4-dienoic acid;

1,4-dihydroxy-beta,2-dimethyl-2-cyclohexene-1-penta-2,4-dienoic acid and the like; when Z is —C N;

1-hydroxy-beta,2,6,6-tetramethyl-4-oxo-2-cyclohexene-1-penta-2,4-dienonitrile;

1,4-dihydroxy-beta,2,6,6-tetramethyl-2-cyclohexene-1-penta-2,4-dienotrile;

beta,2,6,6-tetramethyl-4-oxo-2-cyclohexene-1-penta-2,4-dienonitrile and the like; when Z is hydroxyalkyl;

1-hydroxy-4-methoxy-beta,2,6,6-tetramethyl-2-cyclohexene-1-penta-2,4-dienol;

1,4-dihydroxy-beta,2,6,6-tetramethyl-2-cyclohexene-1-penta-2,4-dienol;

1-hydroxy-4-oxo-beta,2,6,6-tetramethyl-2-cyclohexene-1-penta-2,4-dienol;

1-hydroxy-4-methoxy-beta,2,6,6-tetramethyl-2-cyclohexene-1-hexa-35-dienol;

4-hydroxy-4-(benzoyl-3-methylbuta-1,3-dienyl)-3,5,5-trimethylcyclohex-2-en-1-one;

4-hydroxy-4-(4-benzoyl-3-methylbuta-1,3-dienyl)-3,5,5-trimethylcyclohex-2-en-1-ol;

3-methyl-5-(1-hydroxy-4-methoxy-2,6,6-tri-methyl-2-cyclo-hexen-1-yl)-2,4-pentadieneophenone;

1-hydroxy-beta,2,6,6-tetramethyl-4-oxo-2-cyclohexene-1-penta-2,4-dienoic acid imidazolide;

1,4-dihydroxy-beta,2,6,6-tetramethyl-2-cyclohexene-1-penta-2,4-dienoic acid imidazolide;

1-hydroxy-beta,2,6,6-tetramethyl-4-methoxy-2-cyclohexene-1-enta-2,4-dienoic acid imidazolide;

1-hydroxy-beta,2,6,6-tetramethyll-4-oxo-2-cyclohexene-1-penta-2,4-dienoic acid phenyl ester;

1,4-dihydroxy-beta,2,6,6-tetramethyl-2-cyclohexene-1-penta-2,4-dienoic acid phenyl ester;

4-carbamoylhydrazo-1-hydroxy-beta,2,6,6-tetramethyl-2-cyclohexene-1-penta-2,4-dienoic acid phenylester;

1-hydroxy-beta,2,6,6-tetramethyl-4-methoxy-2-cyclohexene-1-penta-2,4-dienoic acid;

1-hydroxy-beta,2,6,6-tetramethyl-4-oxo-2-cyclohexene-1-penta-2,4-dienoic acid p-methylfulfonylphenyl ester;

1-hydroxy-beta,2,6,6-tetramethyl-4-oxo-2-cyclohexene-1-penta-2,4-dienoic acid p-ethylsulfonylphenyl ester;

1-hydroxy-beta,2,6,6-tetramethyl-4-oxo-2-cyclohexene-1-penta-2,4-dienoic acid p-nitrophenylester;

1-hydroxy-beta,2,6,6-tetramethyl-4-oxo-2-cyclohexene-1-penta-2,4-dienoic acid m-trifluoromethylphenyl ester;

1-hydroxy-beta,2,6,6-tetramethyl-4-oxo-2-cyclohexene-1-penta-2,4-dienoic acid dichloromethylphenyl ester;

1-hydroxy-beta,2,6,6-tetramethyl-4-oxo-2-cyclohexene-1-penta-2,4-dienoic acid monofluoromethylphenyl ester and the like.

It will be readily appreciated that the compounds having the above general formulas may exist as geometric isomers having cis or trans configuration with respect to the double bonds in the carbon chain. Moreover, there may be at least one asymmetric carbon atom present in the compounds and hence the possibility of stereoisomers exists. The general formulae in this specification have been represented without reference to steric configuration, and are to be construed as covering all geometric isomers. Similarly, the formulae are envisaged as including the individual stereoisomers and mixtures, racemic or otherwise, thereof. The abscisic acid derivatives for use in the practice of this invention can be conveniently prepared in accordance with the procedure of U.S. Pat. No. 3,576,839 which is hereby incorporated by reference. Accordingly, preparative procedures will not be described herein in any great detail. Numerous other chemical and physiological analogs of abscisic acid have been shown to exist (An. Rev. Plant Physiol. 25, 259, 1974; pp. 295–347 in *Phytohormones and Related Compounds*, Vol. I, D. S., Letham et al., eds., Elsevier, 1978; Agr. Biol. Chem.38; 801–808, 1974; Agr. Biol. Chem. 42, 1437–1438, 1978). Of, particular interest are the aromatic analogs of abscisic acid (Agr. Biol. Chem. 42, 1437–1438, 1978) and farnesol (New Phytol. 88, 249–254, 1981), because they will be cheaper to synthesize and more stable than abscisic acid in inorganic formulations.

Another group of physiological abscisic acid analogs which is far more diverse chemically is represented by the antitranspirants. The process of transpiration (water loss by evaporation from the leaves) is controlled primarily by the opening and closing of small holes (stomata) which are regulated by the guard cells. The antitranspirants are higly relevant, because of the way in which they act on the guard cells and its similarity to the abscisic acid-promoted transport processes reported in this disclosure. Under natural conditions, abscisic acid causes the guard cells to close by stimulating movement of solites, e.g., out of the guard cells. Most, if not all antitranspirants, cause the stomata to close through action on the guard cells, apparently mimicking abscisic acid. Further discussion and extensive listings of the antitranspirants can be found in *Plant Growth Regulators*, by L. G. Nickell, Springer-Verlag, Berlin (1982), Photo-synthetica 15:305–400 (1981) and Ann. Amelior. Plantes 27:613–638 (1977). Of special interest among the many antitranspirants are Hydrasyl, acetylsalicylic acid, 8-hydroxyquinolinol and daminozide (butanedioic acidmono (2,2-dimethylhydrazide)). Any of these could be expected to promote mineral nutrient uptake by leaves and translocation to fruit as we have demonstrated for abscisic acid.

As a second essential ingredient, the composition of this invention includes one or more sources of nitrogen. Illustrative of useful nitrogen sources are urea, ammonia, and ammonium and nitrate compounds, such as ammonium nitrate, potassium nitrate, ammonium sulfate calcium nitrate, ammonium phosphate, ammonium polyphosphate and the like. Other useful sources of nitrogen include water-soluble urea and formaldehyde condensation products such as methylolurea, methyleneureas and mixtures thereof. Illustrative of such useful water-soluble urea and formaldehyde condensation products are those whose preparation and use are described in detail in Justice U.S. Pat. No. 3,462,256. Still other useful nitrogen sources include water-insoluble urea formaldehyde condensation products such as ureaform. Ilustrative of useful water-insoluble urea and formaldehyde condensation products are the compounds whose preparation and use are described in detail in Formaini U.S. Pat. No. 3,677,746 and Moore U.S. Pat. No. 4,033,745. Water soluble nitrogen sources are preferred for use in practice of the invention, and ammonia, urea, ammonium nitrate, water soluble urea formaldehyde condensation products are particularly preferred. Amongst these particularly preferred polymers, urea and water-soluble urea formaldehyde polymers are most preferred. The amount of the nitrogen source included in the foliar fertilizer composition is not critical and any amount known to those of skill in art for use in foliar fertilizer compositions can be employed. Normally the amount employed will vary depending on the phytotoxic effect on the plant foliage of any particular nitrogen source, the times of application of the composition to the plant, the frequency of such application and the like. In the preferred embodiments of this invention, the quantity of the nitrogen source may vary from about 0.5 to about 50 weight percent based on the total weight of the composition, and in the particularly preferred embodiments of the invention the quantity of nitrogen source may vary from about 1 to about 35 weight percent on the same basis. In the most preferred embodiments of the invention, the quantity of nitrogen source may vary from about 3 to about 25 on the above-referenced basis. The fertilizer composition of this invention preferably includes sources of potassium, sulfur and phosphorus which are preferably in the form of water soluble salts containing these materials. Illustrative of use potassium salts are potassium chloride, potassium sulfate, potassium phosphate, potassium carbonate, potassium bicarbonate, potassium nitrate, potassium, thiosulfate, potassium bisulfate, potassium polyphosphate, and the like. Useful sulfur containing salts include, potassium sulfate, ammonium sulfate, magnesium sulfate, sodium sulfate, potassium thiosulfate, zinc sulfate, zinc thiosulfate, manganese sulfate, iron sulfate, iron thiosulfate, cobalt sulfate, cuprous sulfate, cupric thiosulfate, cupric sulfate and the like. The phosphorus requirements can be satisfied by various phosphate salts such as ammonium, magnesium or potassium or thiophosphates, pyrophosphates, or other condensed higher linear polyphosphates, condensates of sulfur or nitrogen and phosphorus, such as phosphoryl triamide, phosphoronitrilic hexamide and the like. Preferably, some portion of the phosphorus is in the form of a linear polyphosphate, although some orthophosphate and/or pyrophosphate can also be present. In these preferred embodiments, the number of phosphate groups in the polyphosphate usually range from 2 to about 10, but preferably, polyphosphates containing from about 3 to about 8 phosphate groups in the polyphosphate molecule are employed.

The concentrations of these non-nitrogeneous phosphorus, potassium and sulfur plant nutrients are expressed on a $P_2O_5$, $K_2O$ and weight basis respectively. Generally, the quantities of each plant nutrients which are included in the composition of this invention are not critical, and can be varied widely dependent on the needs of the user.

In the preferred embodiments, the quantity of phosphorus is at least about 0.5 to 35 weight percent P (expressed as $P_2O_5$); the quantity of potassium is at least about 0.5 to 30 weight percent (expressed as $K_2O$ by weight) and the quantity of potassium is at least from about 0.5 to about 10 weight percent (expressed as by weight). In the particularly preferred embodiments, the weight percent phosphorus may vary from about 1 to about 15 weight percent, the weight percent of potassium may vary from about .1 to about 10, and the weight percent of sulfur may vary from about 1 to about 5, each expressed on the above-referenced basis. Amongst these particularly preferred embodiments most preferred are those embodiments in which the weight percent phosphorus may vary from about 1 to about 10, the weight percent of potassium may vary from about 1 to about 5 and the weight percent of sulfur may vary from 1 to 3.

The composition of this invention preferably includes a water component. The amount of water employed is noncritical, and can be varied widely. The water component is preferably present in concentrations of up to about 90%, based on total composition weight, preferably from about 50 to about 75%. The water concentration should be adequate to ensure adequate dispersion of the nutrients and in the preferred embodiments of the invention should be adequate to provide a product that is capable of being stored for reasonable times at the lowest expected ambient temperature, preferably about 32 F, without the components salting out of solution to any significant degree. The minimum dilution also aids in the prevention of burning of the plants by a more concentrated solution. On the other hand, in the preferred embodiments the water concentration should not exceed about 75%, since higher dilutions would result inexcessive application of the composition to the plan to provide the high nutrient levels contemplated by this invention, with resulting loss of such nutrients by runoff to the soil at a time when the roots are inefficient at translocating the materials from the soil to the fruit. The preferred water dilution of from about 50 to about 75% assures adequate dispersion on the one hand and minimum runoff on the other hand, resulting in maximum uptake by the plant of the N-P-K values in the solution.

Other micronutrients such as boron, zinc, iron, manganese, copper, molybdenum, cobalt and the like, either individually or in mixtures, may be included in the composition of this invention to correct trace metal deficiencies. Usually these micronutrients are added in the form of aqueous solutions of water-soluble salts or complexes of trace metals. Suitable water-soluble salts include the sulfate, nitrate, halide carbonate, bicarbonate, bisulfate, thiosulfate, phosphate biphosphate, potassium, ammonium, sodium and the like salts of the aforementioned micronutrient trace metals. In addition, various chelating agents can be used to insure water-solubility of the applied trace metals. These chelating agents have two or more atoms, commonly referred to as dentate centers, in the molecule which are capable of forming an ionic or coordinate covalent bond with multivalent metal ions. The compounds are commonly called bidentate or polydentate compounds in reference to the number of dentate groups per molecule. The most common agents have oxygen and/or nitrogen atoms at such centers which are spaced in the molecule to form a 5-, 6- or 7-member ring when the multivalent metal ion is bridged across the centers. Such organic compounds thus have at least two dentatecenters, i.e., nitrogen or oxygen atoms which are separated by 1 to about 3 carbon atoms. Typical substituents in organic molecules which furnish the oxygen and/or nitrogen centers are aldehyde groups, nitro groups, amide groups, carboxyl groups, ester groups, ketone groups, nitroso groups, hydroxyls, etc.

Examples of chelating agents suitable for use in accordance with the invention are:
citric acid,
ethylenediamine,
mono-sodium citrate,
N-methylethylenediamine,
N-ethylethylenediamine,
N-n-propylenediamine, N-isopropylethylenediamine,
N-n-butylethylenediamine,
N-N-dimethylethylenediamine,
N,N-diethylethylenediamine,
N,N'-dimethylethylenediamine,
N,N'diethylethylenediamine,
N,N'-di-n-propylethylenediamine,
propylenediamine,
2,2-dimethyl-1,2-diaminoethane,
1,3-dimethyl-2-,3-diaminobutane,
trimethylenediame,
2,2-dimethyl-1,3-diaminopropane,
2-hydroxy-1,3-diaminopropane,
tetramethylenediamine,
pentamethylenediamine,
ethylenediamine-N,N'-dipropionic acid,
N-butylethylenediaminetriacetic acid,
N-cyclohexylethylene-diaminetriacetic acid,
N-hydroxyethylethylenediaminetriacetic acid,
ethylenediaminetetraacetic acid,
trimethylenediaminetetraacetic acid,
tetramethylenediaminetetraacetic acid,
pentamethylenediaminetetraacetic acid,
1,2-diaminocyclohexane-N,N'-tetraacetic acid,
ethylenediamine-N,N'dipropionic-N,N'-diacetic acid,
ethylenediamine-N,N'-tetrapropionic acid,
N-hydroxyethyl=N,N',N''-diethylenetriaminetetraa-
cetic acid,
diethylenetriaminepentaacetic acid, The fertilizer composition of this invention may include other optional ingredients to improve the effectiveness of the composition, or to provide other beneficial biological effects. For example, the absorption of the composition by the foliage of plants can be accelerated by incorporation of minor amounts, e.g., from about 0.01 to about 10, preferably from about 0.01 to about 5 weight percent, of a surfactant. The surfactant improves the spreading of the composition on the foliage to achieve an even coverage and also assists in absorption of the fertilizer into the foliage. Suitable surfactants include cationic, anionic and nonionic types as well as mixtures thereof.

Examples of the cationic surfactants include: fatty amines, e.g., dodecylamine, octadecylamine; alkarylamines, e.g., dodecyl aniline; fatty amides such as fatty imidazolines, e.g. undecylimidazoline prepared by condensing lauric acid with ethylene diamine, quaternary alkyl and aryl ammonium salts and hydrates, e.g., cetyltriethyl ammonium cetyl sulfate; quaternary ammonium bases of fatty amines of disubstituted diamines, e.g., oleyl methylamino ethylene diethylamine methylsulfate, and the like.

Examples of useful anionic surfactants include the following: fatty acid glyceride sulfonates and fatty acid sulfonates; e.g., sulfonated cottonseed oil, sulfonated oleic acid sulfonated sperm oil, sulfonated tallow, etc.; sulfonated fatty amides, e.g., sulfonated amide of ricinoleic acid, sodium salt of sulfuric ester of oleyl disobutyl amide, etc.; sulfonated anilides of fats, e.g., sodium salt of sulfuric ester of oleylethylanilide; amides of aminosulfonic acids, e.g., sodium sulfonate of oleylmethyl tauride; amides from condensation of fatty acid chlorides with amino acids, e.g., sodium salt of oleyl sarcoside; sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates octadecyl benzene sulfonates, and the like.

Illustrative nonionic surfactants include the polyethylene oxide condensates with hydrophobic groups having a reactive hydrogen. The hydrophobic group can have from about 8 to 5 carbon atoms and from 2 to about 15 molecular weights of a hydrophilic group. The hydrophobic group can be selected from a variety of organic compounds having one or more reactive hydrogens including fatty alkyl or alkenyl alcohols, fatty acids, fatty amines, fatty amides, esterified hexitans or alkyl oralkenyl phenols, and the like.

The effectiveness of the composition can also be improved by incorporation of other adjuvants. Such useful adjuvants include humectants, such as molasses, carbowax, propylene glycol, glycerine, lecithin and other like; adjuvants, and the like.

Various pesticides can be incorporated with the aforementioned solutions to obtain a combined fertilization-pesticidal treatment. The pesticides can be herbicides having a selective action for undesired vegetation or tree species or can be insecticides, larvicides, miticides, nematocides and the like. The sepesticides can be synthetic or naturally occurring chemicals.

Various other plant growth regulants other than abscisic acid derivatives can be included in the composition of this invention. Illustrative of useful plant growth regulants are auxins such as auxins based on the phenoxyalkanoic acid structure as for example 2,4-dichlorophenoxyacetic acid and salts and esters thereof, auxins, based on the indolealkanoic acid structure such as indoleacetic acid and salts and esters thereof and auxins based on the naphthalenealkanoic acid structure such as naphthaleneacetic acid and salts and esters thereof; other plant growth regulators such as triiodbenzoic acid, and the like; and cytokinins such as benzyladenine, kinetin, diphenylurea, zeatin and the like.

As is known to those of skill in the art, the pH of a foliar fertilizer varies directly with its phytotoxicity. In general, foliar fertilizers where the pH is either very high or very low are usually phytotoxic. In the preferred embodiments of this invention, the pH will vary from about 4.5 to about 8.5, and in the particularly preferred embodiments will vary from about 5.5 to about 7.5.

The composition of this invention can be conveniently prepared according to the conventional methods known to those of skill in the art and, therefore will not be described herein in any great detail. Briefly stated, one method of formulating the composition of this invention is to merely dissolve selected sources of the essential components in an appropriate solvent, preferably a non-phytotoxic one such as water.

The foliar fertilizer composition of this invention are preferably substantially free of undissolved fertilizer solids. Moreover, it is preferred to employ concentrated solutions, and to apply the solutions in the form of a fine mist. Conventional field spraying equipment can be used, including sprayers pulled through the fields by tractors, as well as aerial spraying equipment. While the solution concentrations (as distinguished from the nutrient ratios) are not critical, total solid concentrations on a solids to total solution weight basis can advantageously range from about 15 to about 45% solids.

The composition of this invention can be conveniently used to enhance translocation of foliarly-applied nutrients in plants such as field crops. The composition is particularly applicable to the cultivation of soybeans, including both Northern and Southern varieties. However, it can also be applied to other legume field crops which are raised for the production of dry seeds, such as dry beans, dry peas, lentils, chick peas, pigeon peas, peanuts and cow peas. The composition is also believed to be applicable to the cultivation of field corn (maize) and other cereal graincrops, including sorghum, wheat, oats, barley, rye, millet, and rice, as well as other field crops believed to require nutrient ratios similar to corn for foliar feeding such as rape, safflower, sunflower and sesame. Illustrative of other crops whose translocation of foliarly-applied nutrients can be affected by the composition of this invention are fiber crops such as cotton, flax and the like; pasture crops such as various grasses, alfalfa and the like; and forest crops, as for example, conifers such as pine, fir, cedar, hemlock and the like; and hardwoods such as oak, teak, mahogany and the like; vegetable crops such as tomato, potato, cucumber, broccoli, and the like; and fruit crops such as citrus, cherry, almond, and apple.

Timing of application is a significant factor to obtain the best results. The composition of this invention, if applied much before the reproductive stage of growth, do not result in as significant increase in yield as would normally be the case. The compositions can be applied in a single application or multiple applications can be made. In the practice of the preferred embodiments of this invention, conventional fertilizers may be applied to the growing field crops, such as legume field crops or cereal field crops either from the ground or foliarly until the crops have reached the reproductive growth stage in which the seeds are starting to fill. Then, during the reproductive period, the composition of this invention can be applied to the foliage of the crops, either alone or in conjunction with the earlier applied conventional fertilizers to obtain the desired enhancement in translocation of nutrients to the reproductive tissues as other plant parts. The seed-filling period for cereal crops, legume crops and other field 30 crops can be determined by visual inspection. It occurs subsequent to the vegetative stage, after the seed have formed and started to fill. For soybeans, the Vegetative and Reproductive Stages have been defined in Fehr, et al Crop Science, 11,929–931 (November–December 1971).

Vegetative Stages

Vegetative stages are determined by counting the number of nodes on the main stem, beginning with the unifoliolate node, which have or have had a completely unrolled leaf. A leaf is considered completely unrolled when the leaf at the node immediately above it has unrolled sufficiently so the two edges of each leaflet are no longer touching. At the terminal node on the main stem, the leaf is considered completely unrolled when the leaflets are flat and similar in appearance to older leaves on the plant.

| Stage No. | Description |
|---|---|
| V1 | Completely unrolled leaf at the unifoliolate node. |
| V2 | Completely unrolled leaf at the first node above the unfoliolate node. |
| V3 | Three nodes on main stem beginning with the unifoliolate node. |
| V(N) | N nodes on the main stem beginning with the unifoliolate node. |
| Reproductive Stages | |
| $R_1$ | One flower at any node. |
| $R_2$ | Flower at node immediately below the uppermost node with a completely unrolled leaf. |

-continued

| Stage No. | Description |
|---|---|
| $R_3$ | Pod 0.5 cm (¼ inch) long at one of the four uppermost nodes with a completely unrolled leaf. |
| $R_4$ | Pod 2 cm (¾ inch) long at one of the four uppermost nodes with a completely unrolled leaf. |
| $R_5$ | Beans beginning to develop (can be felt when the pod is squeezed) at one of the four uppermost nodes with a completely unrolled leaf. |
| R6 | Pod containing full size green beans at one of the four uppermost nodes with a completely unrolled leaf. |
| R7 | Pods yellowing; 50% of leaves yellow. Physiological maturity. |
| R8 | 95% of pods brown. Harvest maturity. |

As used herein, the terms Vegetative Stages and Reproductive Stages with respect to soybeans have the meanings set out above. With respect thereto, the foliar feeding of soybeans according to the method of this invention is preferably confined to the period between reproductive stages R5 and R7.

The rate of application should be such that sufficient composition is applied to the plant to obtain the desired increase in plant yield. The rate of application will depend on a number of factors, such as environmental conditions, type of crop and the like. It has also been found that this timing and rate of application bear a relationship to one another and to the crop to which they are applied, such that the rate of application and the timing thereof bear a relationship to the yield increase.

The composition is usually applied at a rate of from about 1 to about 600 pounds of nitrogenous nutrients per acre, in a total applied aqueous volume of from about 13 to about 1500 gallons per acre. In the preferred embodiments of the invention like composition is applied at a rate of from about 2 to about 100 pounds of nitrogeneous nutrients per acre in a total applied aqueous volumes of from about 6 to about 250 gallons per acre, and in the particularly preferred embodiments at a rate of from about 3 to about 30 pounds per acre in a total volume of from about 9 to about 75 gallons per acre.

An especially effective embodiment of the composition of this invention is as follows:

a. $H_2O$: from about 25 to about 90%; preferably from about 50 to about 75% (expressed as weight);

b. Urea: ammonium nitrates and/or other sources of nitrogen either singly or in any combinations: from about 0.5 to about 50%, preferably from about 3 to about 35% (expressed as percent N by weight);

c. Phosphorous: from about 0.5% to about 35%, preferably from about 1 to about 25% (expressed as $P_2O_5$ by weight);

d. Potassium: from about 0.5 to about 30%, preferably from about 1 to about 10 (expressed as $K_2O$ by weight);

e. Sulfur: from about 0.5% to about 10%, preferably from about 1 to about 5% (expressed as S;)

f. Abscisic acid derivatives or a physiological analogue: from about $10^{-10}$% to about 10%, preferably from about $10^{-8}$ to about 2%;

g. Other micronutrients such as boron, zinc, iron, manganese and copper: None to nominal amounts as desired.

This composition when used in one preferred method of this invention is applied to the foliage of legume or cereal crops by a fine spray applicator without damage to foliar tissue at the rate of at least 25 pounds aggregate N—$P_2O_5$—$K_2O$—S— abscisic acid derivatives per acre in the following proportions:

| Component | Rate of Application, lbs./Acre |
|---|---|
| Nitrogen (as N) | from about 0.5 to about 50, preferably from about 1 to about 35 |
| Phosphorus (as $P_2O_5$) | from about, 0.5 to about 35, preferably from about 1 to about 15 |
| Potassium (as $K_2O$) | from about, 0.5 to about 30, preferably from about 1 to about 10 |
| Sulfur (as S) | from about, 0.5 to about 10 preferably from about 1 to about 5 |
| Abscisic acid | from about $10^{-10}$ to about 10, preferably from about $10^{-8}$ to about 2 |

In the presently preferred embodiment, the aggregate rate of application is from about 5 to 200 pounds of N-abscisic acid derivative —$P_2O_5$—$K_2O$—S per acre, and preferably from about 10 to about 75 pounds N-abscisic acid derivative —$P_2O_5$—$K_2O$—S per acre.

The following specific examples further illustrate the invention.

EXAMPLE I

Influence of foliar-applied abscisic acid ($1.8 \times 10^{-3}$% wt/wt) on the uptake of $^{32}$P-potassium phosphate for 24 hr. after $^{32}$P applications on the terminal leaflets of "Anoka" soybean explants from early-mid (SD 35) to late (SD 49) podfill was evaluated. The results of these experiments are set forth in FIG. 1. The absorbed $^{32}$P is expressed as a % of the total $^{32}$P applied. An explant is essentially a stem cutting with a leaf, one or more pods (here reduced to one pod with 3 seeds) and a subtending segment of stem. Explants provide an excellent model of the whole plant for most purposes, and they conveniently permit complete standardization and environmental control which is very difficult under field conditions. Here, the explants are cut just before the $^{32}$P is applied and incubated with the cut stems in water for 24 hr. The exact temperature and light regimes and other conditions employed in these experiments are as described in Plant Physiol. 67 (Suppl.):67(1981) and in more detail in Plant Physiol. 71: in press (1983). Early-mid podfill here corresponds to a stage between R5 and R6 (closer to R5), late-mid podfill lies about halfway between 125 and R6, early-late podfill is also between R5 and R6.

The results of this experiment which are set forth in FIG. 1 show that abscisic acid promotes the uptakes of phosphorous by the explant.

The results of this experiment which are set forth in FIG. 1 show that abscisic acid promotes the uptake of phosphorous by the explant.

EXAMPLE II

Response of seed yield in "Anoka" soybean explants to combinations of mineral nutrients and abscisic acid ($2.6 \times 10^{-7}$% wt/wt) supplied via the xylem was evaluated. The explants each of which carry one pod with three seeds, were cut at early-mid podfill. The explants were incubated in the treatment solutions, one containing only abscisic acid ($2.6 \times 10^{-7}$% wt/wt), one containing only mineral nutrients, and one containing a mixture of abscisic acid ($2.6 \times 10^{-7}$% wt/wt) and mineral nutrients. The composition and % composition of the mineral nutrient solution employed in these experiments are as set forth in the following Table I.

TABLE I

| Component | % wt/wt |
|---|---|
| Allantoin | 0.0336 |
| Ca(NO$_3$)$_2$ | 0.0025 |
| KNO$_3$ | 0.0016 |
| K$_2$HPO$_4$ | 0.0031 |
| KH$_2$PO$_4$ | 0.0027 |
| KCl | 0.0015 |
| MgSO$_4$ | 0.0030 |
| H$_3$BO$_3$ | $0.0656 \times 10^{-3}$ |
| MnSO$_4$ H$_2$O | $0.0143 \times 10^{-3}$ |
| CuSO$_4$ 5H$_2$O | $0.0530 \times 10^{-3}$ |
| ZnSO$_4$ 7H$_2$O | $0.0244 \times 10^{-3}$ |
| (NH$_4$)$_6$Mo$_7$O$_{24}$ | $0.00074 \times 10^{-3}$ |
| FeEDTA | $0.292 \times 10^{-3}$ |

The effect on seed yield was evaluated, and the results of the evaluation are set forth in the following Table II.

TABLE II

| Treatment | Increased seed yield (% increase in dry weight over the control, minerals only) |
|---|---|
| Abscisic acid only | +7.2% |
| Mineral nutrients | +3.0 |
| Abscisic acid + minerals | +26.0 |

The results show that when abscisic acid and/or mineral nutrients are supplied via the xylem (through base of the cut stem of the explant), they are quickly pulled up into the foliage. This mode of supply is more akin to the natural route. Both the minerals and abscisic acid alone promote seed growth when supplied the natural way through the stem; however, abscisic acid greatly enhances the effect of the mineral.

EXAMPLE III

The synergistic effect of the major mineral nutrients (nitrogen, phosphorus, potassium and sulfur, "NPKS") combined with abscisic acid on seed yield in soybean explants (variety Anoka) taken at early-mid podfill was studied. These explants carried one pod with 3 seeds.

The aqueous mineral solution used in the experiments had a pH of from 6.2 to 6.4 and is as set forth in following Table III.

TABLE III

| Composition of minerals in "NPKS" | |
|---|---|
| Macronutrients | Amounts in % wt/wt/ |
| NH$_4$NO$_3$ | 0.068 |
| KNO$_3$ | 0.073 |
| K$_2$HPO$_4$ | 0.055 |
| KH$_2$PO$_4$ | 0.090 |
| KCl | 0.049 |
| K$_2$SO$_4$ | 0.143 |

A test formulation was prepared by addition of an amount of abscisic acid to the mineral solution (NPKS) sufficient to provide a formulation containing $1.8 \times 10^{-3}$% wt/wt abscisic acid based on the total weight of the composition.

The mineral solution (NPKS) and the test solutions were sprayed onto the leaves right after the explants were cut at early-mid podfill until runoff. All solutions contained 0.05% wt/wt Tween 80, a wetting agent which is a theoleate ester of sorbitol and its anhydride copolymerized with approximately 20 moles of ethylene oxide per mole of sorbitol anhydride. After application of the solutions, the explants were placed in water and the effects on seed yield were observed.

The results of these experiments are set forth in the following Table IV.

TABLE IV

| Treatment | Increased Seed Yield % increase in dry weight over the minerals only |
|---|---|
| Minerals (NPKS) | 0% |
| Abscisic acid solution | −2% |
| Test formulation (minerals + abscisic acid) | +17% |

Table IV shows the positive synergistic effects of abscisic combined with the major mineral nutrients (NPKS) on seed growth.

What is claimed is:

1. In an improved aqueous foliar fertilizer composition of the type which is applied to the foliage of plants, said composition containing one or more sources of nitrogen, one or more sources or potassium, one or more sources of phosphorus, one or more sources of sulfur and/or one or more sources of other plant macronutrients and micronutrients, the improvement comprises an effective amount of one or more abscisic acid derivatives or functional analogs thereof.

2. A composition according to claim 1 wherein said one or more sources of nitrogen are selected from the group consisting of urea and water-soluble urea formaldehyde condensation products, ammonium salts and nitrate salts.

3. A composition according to claim 2 wherein said source of nitrogen are selected from the group consisting of urea, ammonium salts and nitrate salts.

4. A composition according to claim 1 wherein said effective amount is from about $10^{-8}$ to about 1 weight percent based on the total weight of the composition, and pH being within a range of from about 4.5 to about 8.5.

5. A composition according to claim 4 wherein said effective amount is from about 0.0001 to about 0.10 weight percent.

6. A composition according to claim 4 wherein said effective amount is from about 0.001 to about 0.010 weight percent, and pH being within a range of from about 5.5 to about 7.5.

7. A composition according to claim 1 wherein said abscisic acid or one or more abscisic acid derivatives are of the formula:

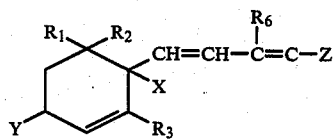

wherein:

Z is selected from the group consisting of:

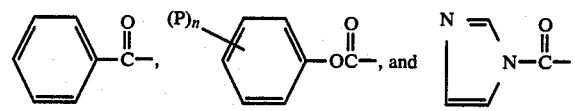

P is alkylsulfonyl having from 1 to about 4 carbon atoms, nitro or halomethyl;

$R_1$, $R_2$, $R_3$ and $R_4$ are individually hydrogen or alkyl having from 1 to about 4 carbon atoms;

X is hydrogen or hydroxy;

Y is hydroxy, oxo, semicarbazono or alkoxy;

A is a metal cation or ammonium radical;

and n is or 1.

8. A composition according to claim 7 wherein Z is

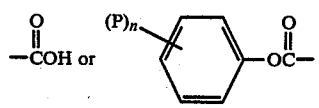

$R_1$, $R_2$, $R_3$ and $R_4$ are individually hydrogen or lower alkyl;

P is hydrogen or hydroxy;

Y is hydroxy, oxo or alkoxy;

and n is 0 or 1.

9. A composition according to claim 8 wherein Z is

Y is oxo;

X is hydroxy; and $R_1$, $R_2$, $R_3$ and $R_4$ are the same or different and are alkyl.

10. A composition according to claim 7 wherein $R_1$, $R_2$, $R_3$ and $R_4$ are methyl.

11. A method of increasing the yield of field crops which comprises treating the foliage of said crop with the composition of claim 1 during the period just before and during the reproductive growth stage.

12. The method of claim 11 wherein the aggregate rate of application is from about 5 to about 200 pounds of N—$P_2O_5$—$K_2O$—S abscisic acid per derivative acre.

13. The method of claim 12 wherein the aggregate rate of application is from about 10 to about 75 pounds of abscisic acid derivative —N—$P_2O_5$—$K_2O$—S per acre.

14. A method according to claim 11 wherein said plant is a field crop.

15. A method according to claim 14 wherein said field crop is a legume grain crop or a cereal grain crop.

16. A method according to claim 15 wherein said field crop is a legume grain crop.

17. A method according to claim 16 wherein said crop is soybean.

18. A method according to claim 17 wherein said field crop is a cereal grain crop.

19. A method according to claim 18 wherein said field crop is corn (maize).

20. A method according to claim 18 wherein said field crop is wheat.

21. A composition capable of being applied as a foliar spray fertilizer, said composition comprising a solution of the following constituents:
   a. $H_2O$: from about 25 to about 90% (by weight);
   b. Nitrogen: from about 0.5 to about 50% (% Nitrogen by weight);
   c. Phosphorus: from about 0.5 to about 35% ($P_2O_5$ by weight);
   d. Potassium: from about 0.5 to about 30% ($K_2O$ by weight); and
   e. Sulfur: from about 0.5 to about 5% (S by weight); and
   f. Abscisic acid derivative: from about $10^{-10}$ to about 10%.

22. The composition of claim 21 containing at least one micronutrient selected from the group consisting of boron, zinc, iron, manganese and copper present in nominal amount.

* * * * *